(12) United States Patent
Syiek et al.

(10) Patent No.: US 8,429,235 B2
(45) Date of Patent: Apr. 23, 2013

(54) APPARATUS AND METHOD FOR PRECLUDING E-MAIL DISTRIBUTION

(75) Inventors: Bronwyn Syiek, San Francisco, CA (US); Nina Bhanap, Menlo Park, CA (US); Rakesh Gowda, Menlo Park, CA (US); Ramesh Guntha, Fremont, CA (US)

(73) Assignee: Quinstreet, Inc., Foster City, CA (US)

( * ) Notice: Subject to any disclaimer, the term of this patent is extended or adjusted under 35 U.S.C. 154(b) by 827 days.

(21) Appl. No.: 12/258,506

(22) Filed: Oct. 27, 2008

(65) Prior Publication Data

US 2009/0132670 A1 May 21, 2009

Related U.S. Application Data

(63) Continuation of application No. 10/600,249, filed on Jun. 20, 2003, now abandoned.

(51) Int. Cl.
| | |
|---|---|
| G06F 15/16 | (2006.01) |
| G06F 15/173 | (2006.01) |
| G06F 17/30 | (2006.01) |
| G06F 21/00 | (2006.01) |
| G06G 7/04 | (2006.01) |
| H04L 29/06 | (2006.01) |
| H04L 9/32 | (2006.01) |

(52) U.S. Cl.
USPC .......... 709/206; 709/204; 709/205; 709/224; 726/2; 726/4; 726/26; 713/167; 713/176; 713/185

(58) Field of Classification Search .......... 709/204–206, 709/224; 726/2, 4, 26, 182; 713/167, 176, 713/185
See application file for complete search history.

(56) References Cited

U.S. PATENT DOCUMENTS

| | | | |
|---|---|---|---|
| 5,864,684 | A | 1/1999 | Nielsen |
| 5,937,162 | A | 8/1999 | Funk |
| 5,999,932 | A | 12/1999 | Paul |
| 6,052,709 | A | 4/2000 | Paul |
| 6,161,130 | A | 12/2000 | Horvitz et al. |
| 6,167,434 | A | 12/2000 | Pang |
| 6,321,267 | B1 | 11/2001 | Donaldson |
| 6,324,569 | B1 | 11/2001 | Ogilvie et al. |
| 6,330,590 | B1 | 12/2001 | Cotten |
| 6,393,465 | B2 | 5/2002 | Leeds |
| 6,480,885 | B1 | 11/2002 | Olivier |
| 6,484,197 | B1 | 11/2002 | Donohue |
| 6,493,007 | B1 | 12/2002 | Pang |
| 6,546,416 | B1 | 4/2003 | Kirsch |
| 6,675,153 | B1 | 1/2004 | Cook et al. |
| 6,760,752 | B1 | 7/2004 | Liu et al. |
| 7,143,189 | B2 | 11/2006 | Cohen et al. |
| 2002/0059385 | A1 | 5/2002 | Lin |
| 2002/0143879 | A1 | 10/2002 | Sommerer |
| 2002/0184315 | A1 | 12/2002 | Earnest |
| 2003/0009480 | A1 | 1/2003 | Lin et al. |
| 2003/0009698 | A1 | 1/2003 | Lindeman |
| 2003/0061289 | A1 | 3/2003 | Clissold et al. |
| 2004/0148506 | A1 | 7/2004 | Prince |
| 2006/0129629 | A1 | 6/2006 | Kawashima et al. |

*Primary Examiner* — David Lazaro
*Assistant Examiner* — Farzana Huq
(74) *Attorney, Agent, or Firm* — Vedder Price PC

(57) ABSTRACT

E-mail addresses are converted by a hashing function into hash codes. An e-mail mass mailer that can have millions of addresses hash codes all addresses to which a message might be sent to form a first list. An entity that wishes to exclude delivery of a message to various e-mail addresses, hash codes such addresses to form a second list. Hash codes in the first list that are also in the second list are purged from the first list to yield a third list of hash codes, each of which represents an e-mail address to which a message may be sent.

42 Claims, 4 Drawing Sheets

APPARATUS AND METHOD FOR PRECLUDING E-MAIL DISTRIBUTION

This is application is a continuation of U.S. patent application Ser. No. 10/600,249 filed on Jun. 20, 2003 now abandoned entitled "Apparatus and Method for Precluding E-Mail Distribution", having as inventors Bronwyn Syiek, et al., and owned by instant assignee and is incorporated herein by reference.

FIELD OF THE INVENTION

This invention is directed to a method and apparatus for managing e-mail message transmission. More specifically, the present invention is directed to a method and apparatus by which proprietary e-mail addresses can be distributed to third party e-mail address filtration service providers.

BACKGROUND OF THE INVENTION

Electronic mail, which is also known as "e-mail," is the transmission of messages over communication networks, such as the Internet. E-mail messages can take the form of notes that are entered into a computer using a keyboard. They can also take the form of attachments to messages.

It is well known that e-mail has many advantages over other forms of communication. E-mail is much less expensive than mail service provided by the U.S. Postal Service (U.S.P.S.). Unlike the U.S.P.S. mail delivery, e-mail is delivered almost instantaneously. When an e-mail message cannot be delivered, an error notification is also received almost instantaneously. Direct solicitations by telemarketing is slow and expensive. Because commercial messages via e-mail are inexpensive to both create and deliver, and because they are delivered almost instantaneously, e-mail is quickly become a marketing tool of choice for many companies.

Unfortunately, the advantages of commercial message transmission by e-mail have caused such messages to overload networks that deliver them. Many Internet service providers claim that unsolicited commercial messages, which are known as "spam" account for most of the e-mail messages they deliver.

SPAM® is a registered trademark of Hormel Foods, Corporation. For years, SPAM® has been used to identify Hormel's deviled luncheon meat spread. Perhaps unfortunately for Hormel, the word "spam" is now also being widely used to refer to unsolicited commercial e-mail messages sent to recipients who have not indicated a willingness to receive such unsolicited email messages from the sender. Spam now taxes the capabilities of many Internet service providers and is widely considered to be an annoyance by Internet users. Legislation to prohibit spam might not be far off.

Many entities that send commercial messages by e-mail have begun to attempt to control unwanted e-mail message transmissions. Because many e-mail advertisers use e-mail lists that are provided by mass mailers, filtering e-mail address lists of an e-mail mass mailer to control spam is problematic because e-mail mass mailers are reluctant to turn over trade secrets embodied in e-mail address lists. Consequently, controlling the transmission of unwanted e-mail distributed by third-party service providers is inhibited by trade secret concerns. A method and apparatus by which e-mail address lists could be filtered to remove addressees who do not want to receive unwanted e-mail messages would be an improvement over the prior art.

A BRIEF DESCRIPTION OF THE DRAWINGS

DETAILED DESCRIPTION OF THE PREFERRED EMBODIMENTS

A hash function is any mathematical algorithm that converts a variable-length string of letters and/or numbers into a fixed-length output string of letters and/or numbers. The output of a hash function is known as a "hash value" or "hash code." Among other things, hash functions are used to create digital signatures of strings of characters.

As is well known, an e-mail address has at least three parts: a name or other designation of an addressee followed by a domain name and a domain. The name and domain name are usually separated by the "@" symbol.

E-mail addresses in general take the form of:

<name of addressee>@<domain name>.<domain>

Where <name of addressee> is an message recipient identifier.

Examples of e-mail addresses (all of which are fictitious) include john.smith@xyz.com fred_morgan@abc.gov s.person@internetserviceprovider.com A hash coder is considered to be a device or software-implementation of a hash function. A hash coder processes variable-length input strings, mathematically operates on the characters of an input string and generates a fixed-length output number or string that is uniquely-valued according to the input string. For a given hashing algorithm, a particular input string will always be encoded into the same output string. Stated alternatively, for every string input to a particular hashing function, there will be a unique output string. Hash codes therefore provide a way to encode an e-mail address string in a way that the hash code can uniquely identify the address, without disclosing the address from which it was calculated. De-hashing a hash code is virtually impossible.

Figure 1:
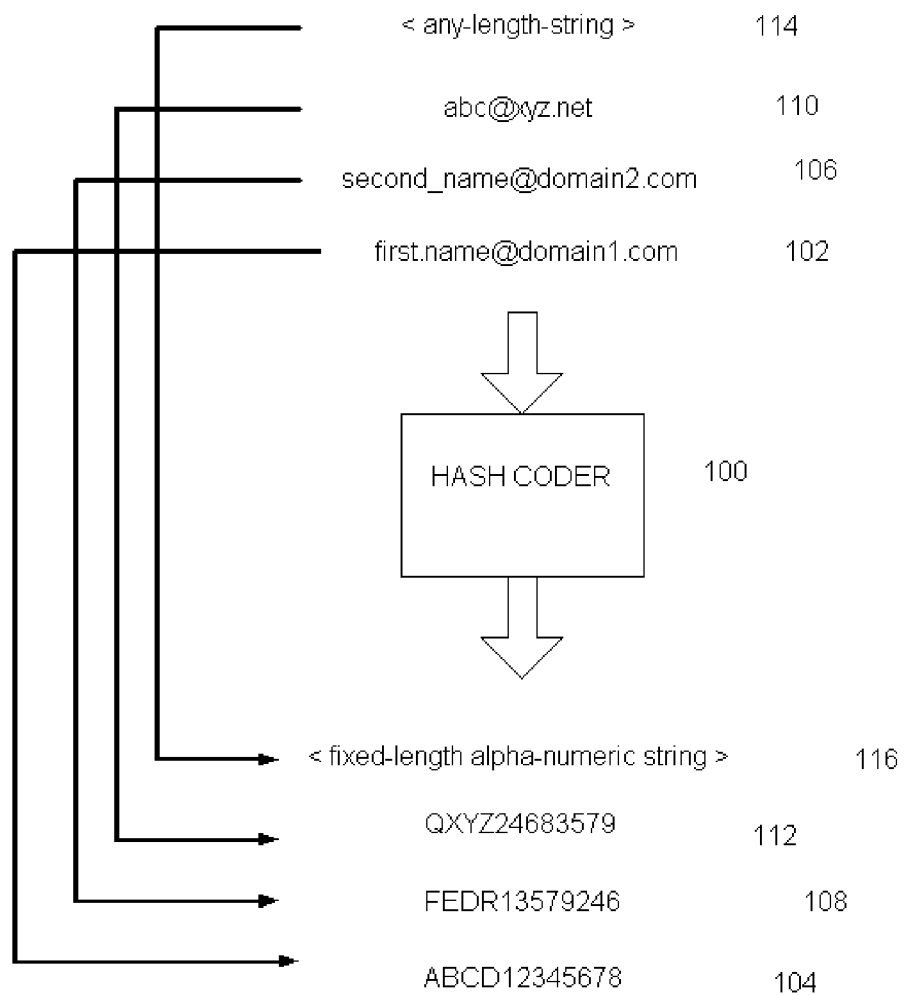
FIG. 1 is a depiction of the operation of a hash coder, implemented in either hardware or software, but known in the prior art.

FIG. 1 depicts a hash coder 100. As is known in the art, the hash coder can encode variable-length strings of text (ASCII representations of alpha-numeric characters) that are e-mail addresses, into fixed-length strings of alpha-numeric characters. Examples of output hash codes are identified by reference numerals 104, 108, 112, and 116 and are depicted as being output from the hash coder 100.

Hash coder 100, can be implemented in hardware using combinational and/or sequential logic devices. Hash coder 100 can also be implemented using software or computer program instructions that are executed on an appropriately-capable processor, examples of which include a microprocessor or micro controller as well as main-frame computer.

In FIG. 1, variable length input e-mail address strings, identified by reference numerals 102, 106, 110, and 114, are input to the hash coder 100. The characters that make up each input string 102, 106, 110 and 114 are operated on by the hash coder 100 and are mathematically processed to be converted by the hash coder 100 into multi-character, fixed-length string of letters and/or digits. Each output string 104, 108, 112, and 116 represents an input e-mail address and is considered to be a "hash code." Each hash code corresponds to, and therefore uniquely identifies a string of characters, which is the e-mail address from which the hash code was generated and to which a message would be sent. The hash coder can accept as input, lists of e-mail addresses and generate lists of hash codes, each of which uniquely represents an e-mail address.

As used herein, a "list" is a multi-element data structure that has a linear organization (first, second, third, . . . ) but that allows elements to be added or removed in any order. A list of hash codes is a multi-element data structure of hash codes.

Those of ordinary skill in the art know that de-hashing a hash code to recover a string from which the hash code was calculated is virtually impossible because of the computational complexity of most hash code algorithms. Hash codes of e-mail addresses can therefore be distributed to third parties without disclosing the actual addresses from which the hash codes were generated. In other words, hash coding is a way of encoding addresses so as to preserve their identity.

In converting an e-mail address to a hash code, the alphabetic characters of an e-mail address are first mapped or converted to lower case characters. (When hashed, an upper case letter and the same lower case letter will yield different hash codes. The characters of the address are then input to a hash coder, which generates an output hash code.

Inasmuch as e-mail addresses are being converted into a form from which the actual e-mail address is not readily apparent, the e-mail addresses are considered herein as being "encoded." Those of skill in the art will recognize that in addition "encoding" e-mail addresses by hash coding, other processes that convert variable-length strings to a fixed-length string could be used instead of hash coding. Therefore, as used herein, the term "encoded" should be construed to include both hash coding per se, but also to include any other process by which variable length strings can be converted to a fixed-length string.

Figure 2:
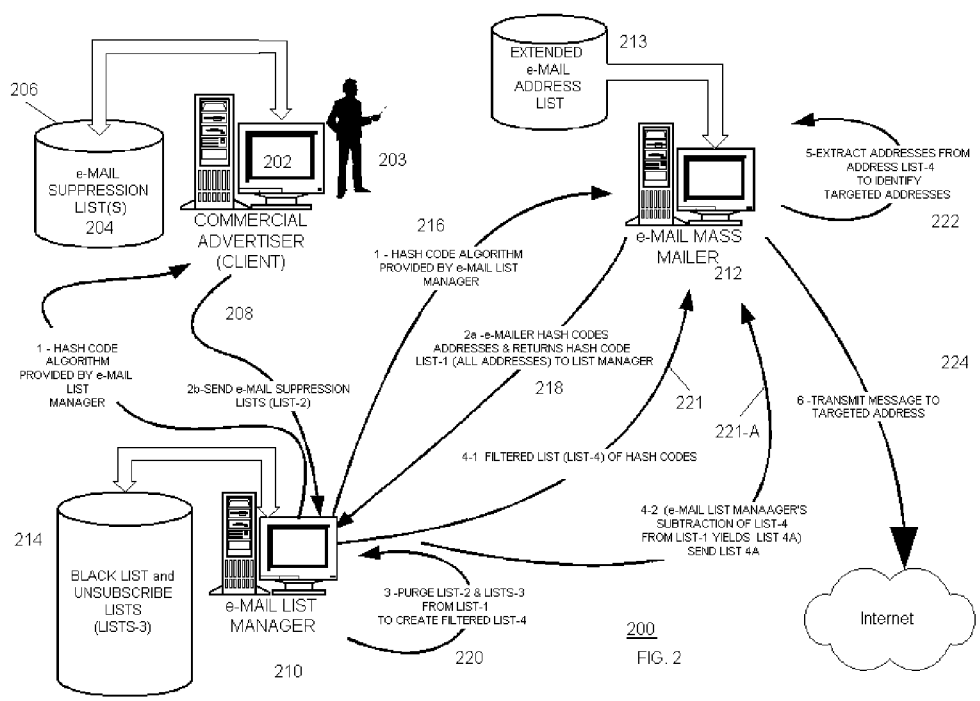
FIG. 2 is a block diagram of a system for filtering e-mail addresses prior to e-mail transmission.

FIG. 2 depicts the components of a system 200 for controlling electronic mail message transmission over a data network, such as the Internet. In one embodiment of a method depicted by FIG. 2, a merchant 203 (of goods and/or services) selectively distributes its commercial/promotional message (advertising its goods and/or services) via e-mail using e-mail address filtering services of an e-mail list manager 210. In another embodiment, the merchant can also use the services of an e-mail mass mailer 212.

As used herein, the term "merchant" refers to a commercial entity that is identified in FIG. 2 by reference numeral 203. A "merchant" distributes commercial messages over the Internet but in order to do so, such an entity requires, uses or operates one or more computers, which are identified in FIG. 2 by reference numeral 202. The "merchant" is a "client" to the list manager 210, described more fully below.

As used herein, an "e-mail mass mailer" is considered an entity that ordinarily distributes or sends e-mail messages indiscriminately, i.e., without any filtering or selectivity. An e-mail mass mailer's computer is shown in FIG. 2 and identified by reference numeral 212. For simplicity of illustration, the e-mail mass mailer's computer 212 and the entity are considered to be one and the same.

Among other things, in one embodiment, the list manager 210, which is also an entity (not shown) that uses or operates one or more computers, provides a marketing function for the merchant. Such marketing activities can include creating commercial message content for the merchant 203. However, the list manager also provides a second service of receiving hashed e-mail addresses from the e-mail mass mailer 212 and filtering from the hashed e-mail addresses it receives, e-mail addresses to which a commercial message should not be sent. Because the hashed e-mail addresses provided by the mass mailer 212 are usually not sorted or filtered by the e-mail mass mailer, when the list manager 210 receives the hashed addresses, the list manager 210 sorts and filters the hashed addresses to remove hashed addresses to which an e-mail message should not be sent.

Part of the list manager's 210 services to the merchant 203 can include the provision of one or more web sites (not shown for clarity) that deliver advertising content on behalf of the merchant 203. Such web sites preferably solicit prospective customers of the merchant 203 to provide their contact information by which the prospective customer of the merchant 203 can be contacted. The information requested of the prospective customer on the web sites preferably includes an e-mail address to which information can be sent to the prospective customer via e-mail. Obtaining contact information of prospective customers through the use of web site advertising is more effective if prospective customers are directed to a web site that promotes the merchant's goods and/or services.

One way to refer prospective customers to commercial messages at a web site is by way of a broadcast e-mail message (i.e., spam) directing someone to visit a web site whereat the merchant's 203 goods and/or services are advertised. If a person visits a web site after receipt of a suggestive e-mail, and then provides his or her contact information, such a person has identified themselves as being interested in the goods or services of the merchant and should be considered for follow-up marketing. In another embodiment of the invention, an unsolicited commercial e-mail message is delivered to numerous addressees having prior business relationships with the e-mail sender directing the e-mail recipients to one or more of the list manager's 210 web sites whereat the merchant's business is promoted. Visitors to a web site and who provide their contact information are considered to be leads that the merchant 203 can follow up with to stimulate additional business.

In promoting goods and services using e-mail, many merchants prefer to avoid offending prospective customers by sending them unsolicited messages, redundant or duplicative messages, or sending messages to people who have specifically requested to not be sent unsolicited commercial messages. Accordingly, commercial messages of the merchant 203 should not be sent to various e-mail addresses and are herein referred to as e-mail addresses to which a message should not be sent. Such e-mail addresses can be obtained from at least three different sources.

One source of e-mail addresses to which an advertisement or promotion should not be sent, are e-mail addresses known to a merchant 203 to be inappropriate. Examples of such addresses include addresses of existing customers to whom additional promotional material or solicitations of new business would be inappropriate. In addition to existing customers, in some instances, sending solicitations for new business to former clients or customers who no longer need the goods or services of the merchant would be inappropriate. Individuals who have asked to be excluded from receiving unsolicited commercial messages should also not be sent an unsolicited commercial e-mail.

Another source of e-mail addresses to which an advertisement or promotion should not be sent are addresses that are known as such to the list manager 210. Examples of such addresses include the addresses of people who have asked the list manager 210 to exclude them from receiving unsolicited e-mail messages regarding that particular merchant only. A request to be excluded from receiving unsolicited e-mail can come to the list manager in the form of a reply to a previously sent e-mail message (i.e., an unsubscribe request) or one of usually two links on an e-mail, on one of which a user "clicks" so as to unsubscribe from either mass mailer's data base by "clicking" on link or unsubscribing from the list manager's 210 data base by "clicking" on the other link. The list manager 210 can receive specific requests from persons who ask to be excluded from all unsolicited commercial message deliveries but the list manager 210 can also purchase lists of addresses to which unsolicited messages regarding any merchant should not be sent. Addresses to which no messages should be sent are considered herein to be a "black list." Sending an unsolicited commercial e-mail message can be counterproductive. Therefore, lists of possibly millions addresses to which a commercial message will be sent, such as lists from a mass mailer, are first compared to addresses known to be addresses to which an unsolicited commercial message should not be sent. Addresses to which unsolicited messages should not be sent are purged from an extended list of addresses to avoid sending what will be considered to be "spam."

In one alternate embodiment, the list manager 210 acts on behalf of the merchant 203 and generates a commercial message, which the list manager 210 sends itself to e-mail addresses or forward to an e-mail mass mailer 212 for delivery. In another alternate embodiment, the list manager 210 creates a commercial message for the merchant 203 but sends the message to an e-mail mass mailer 212 for delivery. In yet another embodiment, marketing services can be provided by an entirely different entity not shown in the figures while the e-mail address list filtration is performed by the link manager 210.

In a preferred embodiment, the list manager 210 receives from the merchant's computer 202, e-mail addresses known to the merchant 203 to be addresses to which the list manager 210 should not send a commercial message on behalf of the merchant 203. E-mail addresses that are known to the merchant 203 to which a message should not be sent are purged by the list manager 210 from lists of e-mail addresses to which such messages will otherwise be sent.

The list manager 210 can also obtain from an e-mail mass mailer an extended list of e-mail addresses, to which a commercial message can be sent, i.e., a first list, albeit without any knowledge of whether any of the addressees wants or does not want to receive an unsolicited commercial message. This so-called "first list" of addresses of potential recipients of a commercial message can be obtained from an e-mail mass mailer 212 or from the aforementioned web sites. Regardless of where or how the "first list" of addresses is obtained, the first list might contain addresses to which a message should not be sent.

In an alternate embodiment, the list manager 210 can send to the e-mail mass mailer 212 one or more e-mail domains to which no messages should be sent. In such an embodiment, the e-mail mass mailer 212 purges from its list, all e-mail addresses that contain a particular domain name or any of the domain names specified by the list manager 210. Remaining e-mail addresses that do not have the objected-to domain names can then be hash coded into LIST-1, with LIST-1 being processed as described otherwise. The extraction of certain e-mail addresses having certain domain names by the e-mail mass mailer 212 can be accomplished a number of ways, including by way of additional functionality that accompanies the hash code software that is distributed to the e-mail mass mailer 212 from the list manager 210.

In a preferred embodiment, the e-mail addresses known to the merchant 203 as addresses to which a message should not be sent comprise a list that is known as a "suppression list" 204. Addresses in a suppression list are often the e-mail addresses of existing customers to whom another promotional message might prove aggravating. Suppression list entries also include former customers or clients, or entities/persons to whom a commercial message might be inappropriate in light of its subject matter.

Addresses lists that are known to the list manager 210 as addresses to which a message should not be sent are known as "unsubscribe lists" and "black lists." An "unsubscribe list" is considered to be a list of e-mail addresses that are of addressees who have requested the list manager 210 (or some other entity) exclude them from future e-mail mailings, albeit with respect to a particular merchant 203 (i.e., a particular client of the list manager 210). The "black list" is considered to be a list of addresses of addressees who have requested the list manager 210 (or some other entity) to exclude them from all future mailings for all merchants (i.e., all clients of the list manager 210) and who should not receive any unsolicited commercial messages.

In order to control the distribution of commercial messages and avoid sending them to addresses where such message are either unwanted or inappropriate, the list manager 210 purges from any list of addresses to which a commercial message will otherwise be sent, all addresses that are on either the suppression list 204, the unsubscribe or the black list 214. The result of purging suppression list 204 addresses and unsubscribe and black list addresses 214 from the first list is a fourth list of addresses to which a commercial message may be sent.

As is well known, customer lists represent trade secrets. E-mail addresses lists are also generally considered customer lists. Exchanging lists of e-mail addresses between the merchant 203, the list manager 210 and the e-mail mass mailer 212 is therefore problematic. By using the invention disclosed and claimed herein, exchanging e-mail addresses without disclosing trade secrets is enabled by hashing the e-mail addresses prior to delivery to another entity. In a preferred embodiment, e-mail addresses to be exchanged between a merchant 203 or its computer 202, a list manager 210 and/or an e-mail mass mailer, are coded by hash coding. By hash coding the variable-length strings of e-mail addresses, the addresses are converted to fixed-length strings or letters and/or numbers, each of which uniquely identifies an e-mail address. Because the hash codes are all the same length, testing them for identity is greatly simplified. By converting lists of e-mail addresses into corresponding lists of hash codes, hash codes on the second and third lists can be purged from lists of hash codes that were computed from e-mail addresses of the first list to yield a list of hash codes that identify addresses to which an e-mail message may be sent. Hashing the e-mail addresses into hash codes enables the existence of an e-mail address in one list to be determined to be in another list without disclosing the actual addresses in any of the lists.

In order for the method disclosed herein to work, hash codes that are sorted and filtered need to be computed using the same hash function. As a result, and as shown in FIG. 2, in a first step, hash code software that implements a hash code algorithm is provided to (the computer of) the merchant 202 and to the e-mail mass mailer 212, thereby providing them with the ability to hash e-mail addresses into uniform-length hash codes.

In addition to distributing the hash code software, in step 218, the software that the list manager 210 distributes to the e-mail mass mailer 212 performs additional functionality on the computer(s) of the e-mail mass mailer 212. In a preferred embodiment, the software distributed to an e-mail mass mailer 212 from the list manager 210 also performs the functions of comparing the lists returned to the e-mail mass mailer 212 by the list manager 210 to the lists originally sent out by the e-mail mass mailer. In addition and as set forth below, software distributed by the list manager 210 to the e-mail mass mailer also provides functionality by which one or more e-mail address domains can be identified to the e-mail mass mailer 212. The e-mail mass mailer 212 can then delete, remove or exclude from the list of e-mail addresses that it will hash, all addresses within one or more domain names. In a preferred embodiment, the software distributed in step 218 also performs the function of extracting e-mail address strings from a hash code returned to the e-mail mass mailer, which is a procedure/process described more fully below.

After distributing the hash code software, in step 218 the list manager 210 receives a first list of hash codes (i.e., LIST-1) from an e-mail mass mailer 212, each of which represents an e-mail address. In step 208, the list manager 210 also receives a second list of hash codes from the merchant's computer 202 (i.e., LIST-2) each of which represents an e-mail address on the merchant's 203 suppression list 204. E-mail addresses in the list manager's 210 unsubscribe list and black list are also hash coded by the list manager 210 using the same hash code algorithm that was distributed to the merchant 202 and the mass mailer 212 to form a third list (i.e., LIST-3).

In order to expedite the search for hash codes in the various lists, the first, second and third lists of hash codes are each sorted by the list manager 210 using a prior art sorting algorithm known as "Quick Sort." Sorting techniques are well known. Other sorting algorithms could certainly be used. In a preferred embodiment, list entries are sorted in ascending order. However, list entries could also be sorted in descending order.

In step 220, sorted list entries are compared to each other to identify hash codes in LIST-1 that also appear in either LIST-2 or LIST-3. Hash codes in LIST-1 that appear in either LIST-2 or LIST-3 are purged from LIST-1 to yield a fourth list of hash codes, each of which represents an address to which an e-mail message may be sent (i.e., LIST-4). In step 221, LIST-4 is returned to the e-mail mass mailer (i.e., its owner), which extracts from the fourth lists of hash codes, each e-mail address on the first list, the hash code of which remains in the fourth list. The resultant list of e-mail addresses are considered to be a list of targeted addresses.

In step 221, the fourth list, which is also considered to be a "filtered" or "purged" list of hash codes, represents a set of addresses to which an e-mail message of the merchant 203 may be sent. After the filtered list is returned to the e-mail mass mailer in step 221, in step 222, the e-mail mass mailer 212 extracts or correlates each hash code in LIST-4 to the list of e-mail addresses from which LIST-1 was created to yield a set of targeted addresses to which a message can be transmitted in step 224

As shown in FIG. 2, the merchant's computer 202 is operatively coupled to and thereby accesses a mass storage device 206 on which is stored the suppression lists 204. The mass storage device 206 also stores program instructions, which imbue the computer 202 with the ability to access a data network such as the Internet via a data network interface (not shown for clarity of FIG. 2 but well-known to those of ordinary skill). By way of data transmissions over a network such as the Internet, the computer 202 can upload and download files via a data network, such as the Internet.

Program instructions stored in the mass storage device 206 include program instructions obtained from the e-mail list manager, which when executed by the computer 202 cause it to hash code e-mail addresses in the suppression lists 204 are stored in a file or database.

In the aforementioned preferred embodiment, hash codes corresponding to e-mail addresses of the suppression list 204 are uploaded via the Internet (or other data network) to the e-mail list manager 210. As shown in FIG. 2, the list of hash codes representing addresses to which an e-mail should not be sent is identified as "LIST-2" and sent to the e-mail list manager.

Using the same hash code algorithm that was provided to the commercial advertiser's computer 202, the e-mail mass mailer hash codes all of the addresses in the list(s) to which a commercial message might be sent. As shown in FIG. 2, the list of hash codes from the e-mail mass mailer is sent to the e-mail list manager and identified as "LIST-1."

Inasmuch as the commercial advertiser's computer 202 and the e-mail mass mailer 212 use the same hash code algorithm, the hash codes that are returned to the e-mail list manager 210 will be of the same length, which is a necessity in order to meaningfully compare hash codes in the various lists. If an e-mail address in the aforementioned suppression list (i.e., LIST-2) is also in e-mail mailer's list (i.e., LIST-1), when that particular e-mail address is hashed it should be converted into the exact same hash codes, regardless of who executes the hashing algorithm. That the hash codes are calculated using the same hash code algorithm enables the hash codes to be compared with any duplicates in the lists identifying duplicate addresses.

Figure 3:
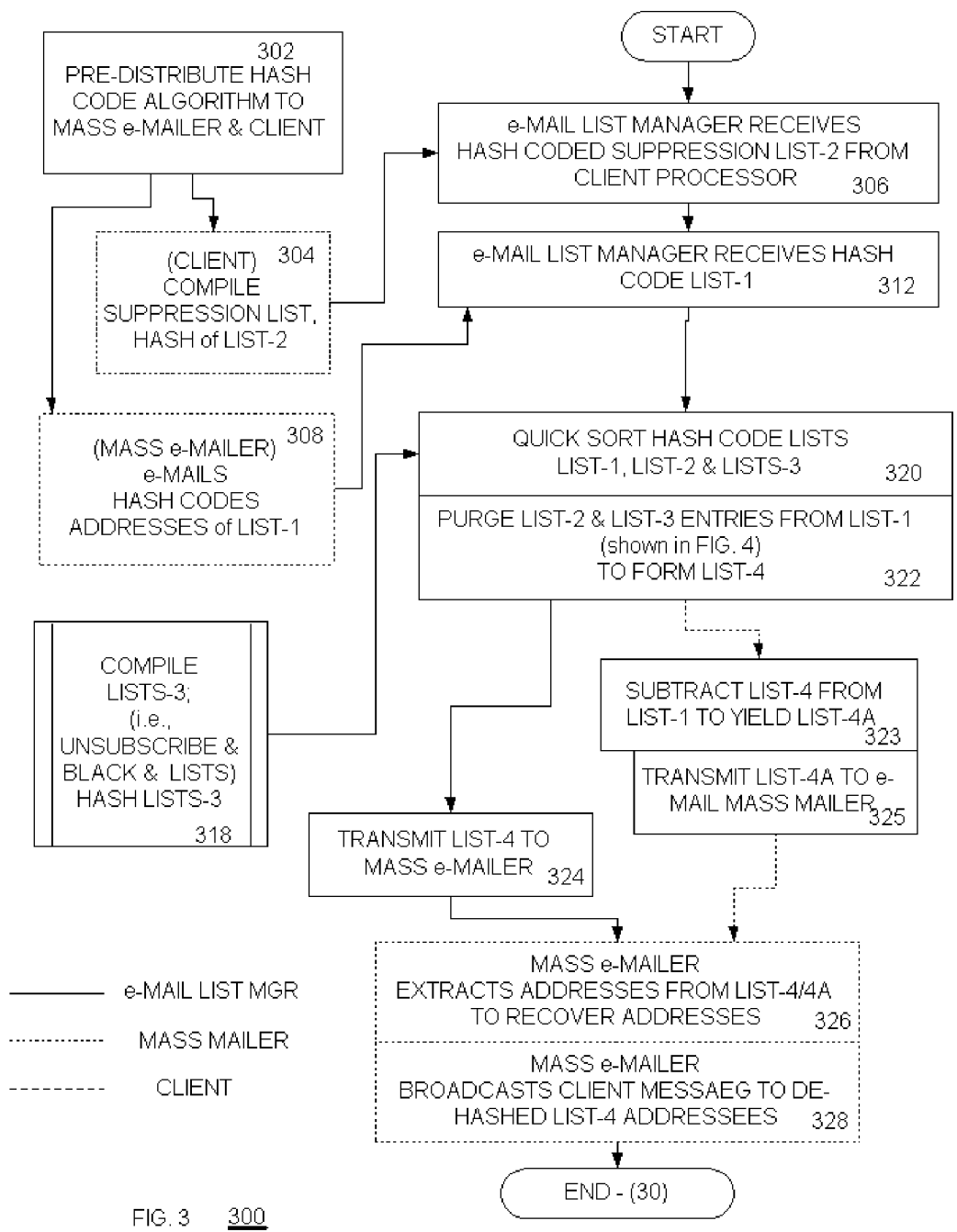
FIG. 3 is a flow diagram of a method for controlling electronic mail message transmissions.

FIG. 3 depicts a method of controlling electronic mail transmission over a network using the system depicted in FIG. 2. As shown in the FIG. 3 legend, program steps outlined with solid lines are steps performed by the e-mail list manager 210 of FIG. 2; program steps outlined with dashed lines are performed by either the e-mail mass mailer 212 or the merchant's computer 202, which are also shown in FIG. 2.

In step 302, the e-mail list manager (210) pre-distributes hash coding software to both the client/commercial advertiser computer (202) and to the e-mail mass mailer (212). By using the same hash code algorithm, hash codes calculated by the merchant 203, the list manager 210 and the e-mail mass mailer 212 can all be meaningfully compared. The presence of the same hash code in LIST-1 and either LIST-2 or LIST-3 means that the same address in the first list of e-mails addresses (that was reduced to a particular hash code) must also be in the lists of e-mail addresses that were hashed to form LIST-2 and LIST-3, which are the lists of e-mail addresses to which an e-mail message should not be sent.

In step 304, the merchant's computer 202 hash codes the list of addresses in the aforementioned suppression list using the software provided by the e-mail list manager in step 302. In addition, in step 304, the merchant's computer (202) uploads the hash codes that represent e-mail addresses in the merchant's suppression list (204), to the e-mail list manager 210. The hashed addresses from the merchant's 203 suppression list comprise LIST-2.

Step 306 shows the e-mail list manager's 210 receipt of LIST-2 from the merchant's computer 202. In step 308, the e-mail mass mailer (212) hash codes its list of e-mail addresses and uploads the resultant list of hash codes, which is denominated as LIST-1, to the e-mail list manager 210. In an alternate and equivalent embodiment, the e-mail mass mailer (212) can hash its list of e-mail addresses at any time after it receives the hash code software or hash code algorithm. The e-mail mass mailer 212 does not need to wait until steps 304 or 306 have been executed in order to hash its e-mail addresses and/or send them to the list manager 210.

Step 312 shows the list manager's 210 receipt of LIST-1, which as depicted in FIG. 3 occurs after LIST-2 is delivered to the list manager 210 in step 304. The order of hash code list deliveries to the list manager 210 is not critical. In an alternate and equivalent embodiment, LIST-1 is delivered to the list manager 210 prior to, or simultaneously with the delivery of LIST-2 to the list manager 210.

In a preferred embodiment, the LIST-2 (i.e., the suppression list) is delivered to the list manager on a regular basis, e.g., whenever the merchant 203/client gets new e-mail addresses. The merchant 203 can either append to or replace a previously-sent suppression list. In "appending" e-mail addresses to a previously-sent list, the new e-mail addresses sent by the client are added to an existing suppression list. In "replacing" e-mail addresses, all of the e-mail addresses in the existing suppression list are deleted and new e-mail addresses are added to the suppression list. The e-mail mass mailer 212 sends its list whenever it is required to send a mass e-mail campaign. The list manager 210 need not receive the hashed email addresses in any particular order from either the merchant 203 or the e-mail mass mailer 212.)

As stated above, the e-mail list manager 210 can also generate it's own list of e-mail addresses to which e-mail messages should not be sent. Such addresses are referred to herein as an "unsubscribe list." The list manager 210 can also purchase lists of e-mail addresses to which messages should not be sent. Such addresses are referred to herein as "black lists."

"Black lists" and "unsubscribe lists" are both lists of addresses to which unsolicited commercial messages should not be sent. For simplicity of illustration and explanation, both the unsubscribe list and the black list are referred to herein as LIST-3. In step 318, the e-mail list manager 210 generates, compiles, acquires or otherwise obtains one or more of the e-mail addresses, which when hashed make up LIST-3.

As is well-known, an e-mail mass mailer 212 can collect millions of e-mail addresses, which when hashed will yield millions of hash codes. Determining whether an entry in LIST-2 or LIST-3 is in LIST-1 is accomplished in significantly less time if all of the lists are sorted prior to comparison. In a preferred embodiment, LIST-1, LIST-2 and LISTS 3 are sorted in step 320 in ascending alpha-numeric order using "Quick Sort" which is a sorting algorithm well-known to those of ordinary skill in the art. Quick Sort sorts the hash code lists in an ascending alpha-numeric order. The numbers zero through 9 are sorted first, then alphabetic characters from A to Z are sorted next. After LIST-1, LIST-2 and LIST-3 are sorted in step 320, their respective elements (i.e., the hash codes in each list) will be in an ascending alpha-numerical order.

In step 322, the entries of LIST-2 and LIST-3 that appear in LIST-1 are "purged" from LIST-1 to form LIST-4. Although "purging" elements from LIST-1 connotes a removal of elements, step 322 encompasses any methodology by which the entries of LIST-1 that do not also occur in LIST-2 or LIST-3 become components of LIST-4. LIST-4 could also be generated by flagging or marking elements of LIST-1 that also appear in LIST-2 or LIST-3. Regardless of how it is created, the hash codings of addresses of LIST-1 that do not appear on either LIST-2 or LIST-3 are sent back to the e-mail mass mailer 212. In a preferred embodiment, those addresses are sent as a list denominated as LIST-4.

Inasmuch as LIST-4 is a list of hash codes, the addresses of the e-mail mass mailer that were hashed to form LIST-1, are correlated or cross-referenced to addresses in LIST-4 in order to extract addresses to which an e-mail message may be sent. In step 324, LIST-4 is returned to the e-mail mass mailer 212 whereat LIST-4 is used to identify e-mail addresses in LIST-1 from which the elements of LIST-4 were calculated. Those e-mail addresses, the hash codes of which are in LIST-4, are addresses to which a commercial e-mail message may be sent.

In an alternate embodiment, the data network transmission time required to send LIST-4 back to the e-mail mass mailer 212 can be significantly reduced by subtracting hash codes that make up LIST-4 from LIST-1, to yield LIST-4A. In such an alternate embodiment, in step 323, LIST-4 is subtracted from LIST-1 to yield LIST-4A. LIST-4A is then a list of hash codes of LIST-1 that were purged by the list manager 210.

In most instances, LIST-4A will be considerably smaller than LIST-4. In step 325, LIST-4A, which is a list of hash codes of addresses that were purged, is uploaded to the e-mail mass mailer 212. Upon receipt of LIST-4A, the e-mail mail mass mailer subtracts LIST-4A from LIST-1 to yield LIST-4, albeit by the e-mail mass mailer 212.

In step 326, the e-mail mass mailer (212) extracts, correlates or otherwise recovers e-mail address strings, which when they are hashed, render values that are elements of LIST-4. If LIST-4A was sent to the e-mail mass mailer 212 in step 325, LIST-4A hash codes can be correlated with addresses that were hashed to make LIST-1 such that addresses that were hashed to yield an entry in LIST-4A are not sent an e-mail message.

In step 328, the e-mail mass mailer (212) broadcasts a commercial message to addresses that were extracted from the hash codes that make up LIST-4.

In an alternate embodiment, the list manager 210 can compile LIST-1 from other sources, such as the aforementioned web sites that collect information from prospective customers of the merchant 203. In such an embodiment where LIST-1 is compiled by the list manager 210, step 308 is not required. Step 312 would be modified to show that the e-mail list manager 210 was in receipt of LIST-1 and had previously calculated a hash code for each address to which an e-mail message could be sent.

Figure 4:
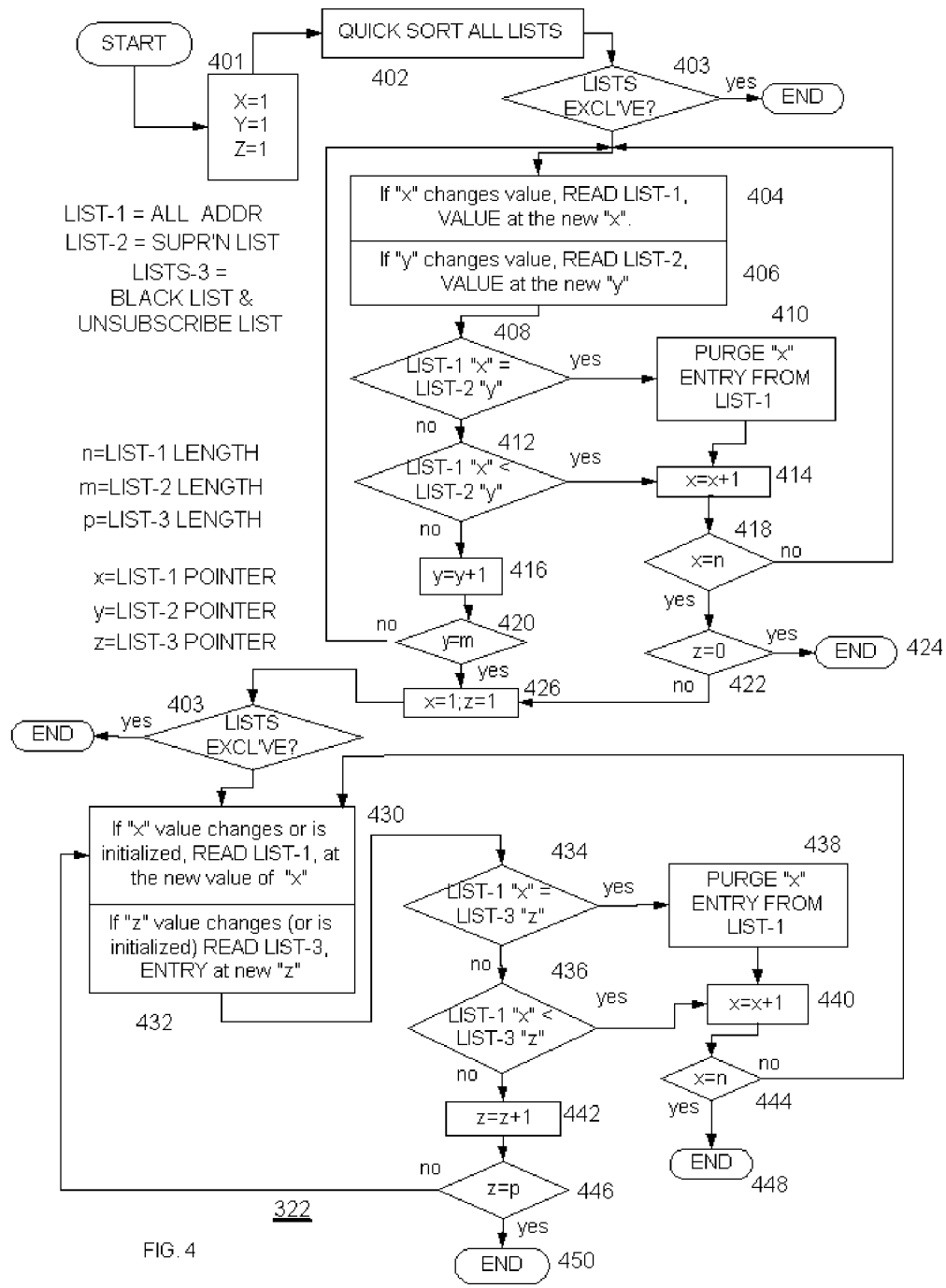
FIG. 4 is a flow diagram of a method used in the method of FIG. 3 showing an element-by-element comparison of hash codes.

In such an alternate embodiment, the list manager 210 could also accumulate an unsubscribe list and a black list using the same methods described above. The hash codes that make up LIST-3 would be calculated in step 318. FIG. 4 depicts step 322 of FIG. 3 in detail and shows a method of removing the hash codes of LIST-1 that also appear in either LIST-2 or in LIST-3.

In step 401, three loop counters "X," "Y," and "Z" are initialized to the value "1." The loop counters are used as pointers to elements of sorted LIST-1, LIST-2 and LIST-3. Loop counter x identifies a hash codes in LIST-1; loop counter y identifies hash codes in LIST-2. Loop counter z identifies hash codes in LIST-3, although LIST-3 can have hash codes that represent black listed e-mails and also unsubscribe list e-mails. In FIG. 4, when x=1, the first value of LIST-1 will be read and compared to a y'th value from LIST-2. When x=2, the second value of LIST-1 will be read and compared to an x'th value of LIST-1. When y=1, the first value of LIST-2 will be read. When z=2500, the 2500'th value of LIST-3 will be read.

In step 402, LIST-1, LIST-2 and LIST-3 are sorted using the aforementioned Quick Sort algorithm. In a preferred embodiment, LIST-1, LIST-2 and LIST-3 are sorted in ascending alpha-numeric order. When the lists are sorted in ascending alpha-numeric order, the first entry in each list will have the lowest alpha-numeric value of all values in each list. The last entry of each list will be the highest-valued entry in each list. When the lists are so ordered, the search for common hash codes can be accomplished faster by reading a first value from LIST-1. LIST-2 (or LIST-3) is then read, element-by-element. Each element from LIST-2 (or LIST-3) is compared to the first element of LIST-1 until a match between two element is determined or until the value of the LIST-2 hash code exceeds the value of the first LIST-1 hash code.

When the value of a LIST-2 hash code exceeds the value of the LIST-1 hash code, the next element of LIST-1 is read and compared to the preceding value from LIST-2 and all successive entries from LIST-2 until a LIST-2 value matches the LIST-1 value or until the LIST-2 value exceeds the LIST-1 value.

The comparison of LIST-1 entries to LIST-2 (and then LIST-3 entries) continues until the end of LIST-1 or LIST-2 is reached. When the end of LIST-2 is reached, LIST-3 is compared to LIST-1 in the same manner as was LIST-2.

The steps of the sorting methodology might not need to be performed if there are no elements in LIST-2 and LIST-3 that are in LIST-1. In order to avoid wasting processor time, in step 403, the lists, i.e., LIST-1, LIST-2 and LIST-3 (actually the two or more lists that comprise "LIST-3") are tested to determine whether the lists are mutually exclusive, i.e., whether there are no elements in any of the lists that are common. List mutual exclusivity is quickly and easily determined by comparing the end values of the lists, albeit after the lists are sorted.

One test of mutual exclusivity is performed by testing the value of the first element of LIST-1 against the value of the last element of LIST-2 and LIST-3. If the value of the first element of LIST-1 is greater in value that the value of the last element of LIST-2 and LIST-3, all of the elements of LIST-1 are greater in value than the elements of the other lists and there are no elements in LIST-2 or LIST-3 in LIST-1. If either LIST-2 or LIST-3 has a terminal value greater than the first value of LIST-1, there might be an element of LIST-2 or LIST-3 in LIST-1 so the steps after step 403 need to be performed as set forth below.

Another equivalent test for mutual exclusivity is testing the value of the last element of LIST-1 against the value of the first element of LIST-2 and LIST-3. If the last element of LIST-1 is smaller than the value of the first element of LIST-2 and LIST-3, there are no elements in LIST-2 or LIST-3 in LIST-1. If either LIST-2 or LIST-3 have an initial value less than the terminal value of LIST-1, there might be a value in LIST-2 or LIST-3 that exists in LIST-1 so the steps after step 403 need to be performed as set forth below. In FIG. 4, at step 404, using the loop counter x that was initialized to 1 in step 401 as a pointer, the first hash code from LIST-1 is read from memory into an accumulator or other register where it can be evaluated. In step 406, using the loop counter y as a pointer, the first hash code from LIST-2 is also read into a register from memory.

Inasmuch as both LIST-1 and LIST-2 entries are hash codes of the same length and since both LIST-1 and LIST-2 were sorted according to the same criteria, if the first hash code of LIST-1 is found in LIST-2, such an entry of LIST-1 is a hash code of an e-mail address to which a message should not be sent. Such an entry of LIST-1 is purged from LIST-1.

In step 408, a test is performed to determine whether the x'th hash code in LIST-1 is equal to the y'th hash code of LIST-2. If the result of step 408 is positive, the x'th hash code of LIST-1 is "purged" from LIST-1 in step 410, thereby creating at least part of LIST-4 by deleting an entry from LIST-1. After step 410, the loop counter x is incremented in step 414 by which the next hash code in LIST-1 will be tested against the y'th value of LIST-2, if the end of LIST-1 has not been reached as determined at step 418.

In step 418, a test is performed to determine if the LIST-1 pointer value of x (which was incremented in step 414) has reached a value n, which is shown in the legend of FIG. 4 to be the number of entries in LIST-1. If at step 418 x is not equal to n, the end of LIST-1 was not reached and program control returns to step 404 where the next x entry is read from LIST-1.

If the next x entry of LIST-1 equals the same y entry of LIST-2, it too is purged from LIST-1 in step 410. If not, program control proceeds to step 412.

If the result of the test at step 408 is negative, the x loop counter is not incremented as in step 414, but a test is instead performed at step 412 to determine whether the x 'th entry is less than the y' th entry. If the result of the test at step 412 is positive, the x'th entry is smaller than the y'th entry and as a result, the next x'th entry is retrieved for testing by incrementing the x loop counter in step 414. Whether the end of LIST-1 has been reached is tested in step 418 as before.

If the test at step 412 is negative, the x'th entry of LIST-1 is greater than the y'th entry of LIST-2, which means the next y entry of LIST-2 should be tested against the current x entry of LIST-1. In step 416; the y loop counter will be incremented.

Step 420 tests whether the end of LIST-2 has been reached. If the result of step 420 is negative, program control returns to step 404 whereupon the next y entry is retrieved/tested from LIST-2. If at step 420 the result is positive, LIST-2 has been exhausted, at step 426, the x value is re-initialized and the z counter is initialized enabling the testing of LIST-3 against LIST-1.

As can be seen in steps 404 and 406, they are executed only if their respective values were changed in previously-executed steps.

It should be apparent to those of ordinary skill that, when program steps 404, 406, 408, 410, 414 and 418 are executed, every occurrence of an entry from LIST-2 in LIST-1 causes the deletion or purging of the LIST-2 entry from every occurrence of LIST-1. Inasmuch as the lists were sorted and may contain multiple entries of a hash code, repeated occurrences of an e-mail in LIST-1 that appears in LIST-2 are all purged.

With respect to the test at step 408, if an x'th value of LIST-1 is not equal to an y'th value of LIST-2, a test is performed in step 412 to determine if the x'th hash code value being compared to the y'th value, is less than the y'th value. Because the lists LIST-1, LIST-2 and LIST-3 were sorted in ascending order, a determination that the x'th value is less than a y'th value at step 412 means three things: first, the two hash codes are not identical; second, the x'th hash code does need to be purged; third, the next x'th value needs to be tested against the same y'th value before incrementing y in order to determine whether the next x value might be in LIST-2.

If at step 412 the y'th value is greater than the x'th value, at step 414, x is incremented again in step 414 in order to retrieve the next-highest valued hash code in LIST-1 and compare it to the previously tested y value.

If at step 412, the x'th value is not less than the y'th value, the x'th value is therefore larger than the y'th value (because the test at step 408 failed). The loop counter x is not incremented. The y loop counter is incremented instead at step 416 in order to retrieve the next-greater valued hash code in LIST-2. Before retrieving the next hash code from LIST-2, at step 420 the y loop counter value is checked against the value of m, which is set equal to the number of entries in LIST-2, as shown in FIG. 4.

If the value of y at step 420, is less than m, meaning that the last entry of LIST-2 has not been checked, program control returns to step 404 where the previously-read x value is read at step 404 followed by the retrieval of the next value from LIST-2. At step 408, the value of the x'th and y'th values are compared as before.

It should be apparent to those of ordinary skill that program steps 404, 406, 408, 412, 416 and 420 compare a particular hash code from LIST-1 and to hash codes from LIST-2. These steps check the particular hash code from LIST-1 against successive values from LIST-2 until a hash code of LIST-2 value equals the x value or, until a y value greater than the x value is read, or until the end of LIST-2 is reached.

Step 426 is reached when the end of LIST-1 or LIST-2 has been reached. At step 426, the LIST-1 loop counter x is reset to 1 and a LIST-3 loop counter, z is also set to 1 so that LIST-3 can be checked against LIST-1.

At step 430, entries of LIST-1 are compared against entries of LIST-3 using the same search strategy set forth above. Inasmuch as LIST-3 is described as possibly including a black list and/or an unsubscribe list, LIST-3 can actually include two (2) lists. In such a case, the steps 430-450 need to be repeated for both the unsubscribe list and the black list. In an alternative embodiment, the unsubscribe list entries and the black list entries can be merged into a single list that is compared to LIST-1 entries. For purposes of illustration however, only one component list of LIST-3 is depicted as being checked against entries of LIST-1.

At step 430, the first entry of LIST-1 is read. At step 432 the first list of LIST-3 is read.

At step 434, the x'th entry of LIST-1 is compared to the z'th entry of LIST-3. If these two hash codes are identical, program control proceeds to step 438, whereat the x'th entry of LIST-1 is purged because it was detected in step 434 as being equal to the z'th entry of LIST-3.

If at step 434 it is determined that the x'th entry of LIST-1 is not equal to the z'th entry of LIST-3, the test at step 436 determines if the x'th entry value of LIST-1 is less than or greater than the z'th entry of LIST-3. Inasmuch as LIST-1 and LIST-3 are sorted in ascending order, if the x'th entry of LIST-1 is larger than the z'th entry of LIST-3, the next entry of LIST-3 is read by incrementing the z loop counter at step 440. At step 444, the z loop counter is checked against the length of the LIST-3 to determine if the last entry of LIST-3 was checked. If yes, the loop terminates at step 448. If no, program control returns to step 430 where the previously-read value of LIST-1 is compared against the next value of LIST-3.

In light of the foregoing, it should be apparent to those or ordinary skill that the method depicted in FIG. 4 provides for a comparison of hash codes in LIST-1 against hash codes in LIST-2 and LIST-3. Each hash code of LIST-1 is checked against a series of hash codes from LIST-2 and LIST-3 until the value from LIST-2 and LIST-3 exceed the hash code of LIST-1 being tested whereupon the next-highest hash code from LIST-1 is checked against the most-recent value from LIST-2 and LIST-3.

In a preferred embodiment, the hash codes were forty characters in length.

By Quick sorting each list and checking values of LIST-1 against values of LIST-2 and LIST-3, it is possible to quickly sort through millions of hash codes in the lists to purge hash codes from LIST-1 that appear anywhere in LIST-2 or LIST-3.

In an alternate embodiment, entries of LIST-2 and LIST-3 can be hash codes of e-mail addresses to which commercial messages can be sent instead of hash codes of e-mail addresses to which e-mail messages should not be sent. In such an alternate embodiment, hash codes in LIST-1 that do not also appear in LIST-2 or LIST-3 should be purged from LIST-1, from which LIST-4 is created, instead of being purged from LIST-1 if they do appear in LIST-2 or LIST-3.

In yet another embodiment described above, LIST-4 hash codes can be subtracted from the LIST-1 hash codes to yield a "LIST-4A." In such an embodiment, LIST-4A represents the addresses of LIST-1 that appear in either LIST-2 or LIST-3 and which were purged from LIST-1. Inasmuch as LIST-4A is usually much shorter than LIST-4, calculating LIST-4A means that the time required to transmit hash codes to purge can be significantly reduced. Upon receipt of LIST-4A, the e-mail mass mailer 212 purges LIST-4A entries from LIST-1 yielding LIST-4. Entries of LIST-4 can be correlated with the original e-mail lists from which LIST-1 hash codes were calculated to yield the list of e-mail targeted addresses, identified in FIG. 2 by reference numeral 224.

Although the preferred embodiment contemplates that the function of the e-mail list manager 210 is separate and apart from both the e-mail mass mailer 212 and the commercial advertiser's computer 202, the steps of computing and comparing hash codes of the commercial advertiser's suppression list (or authorization list) to the hash codes of an e-mail mass mailer 212 could all be performed by the merchant's computer 202. Conversely, the hash code computation and comparisons could all be performed by the e-mail mass mailer. Accordingly, the salient aspects of the method are the reception of a first set of hash codes, each of which represent an e-mail address to which a message can be sent. The entries of the first set of hash codes are compared to entries in at least a second set of hash codes, each of which represents an address to which an e-mail address should not be sent. Hash codes in the first set that are also in the second set are purged from the first set, leaving a set of hash codes, each of which represents an address to which a commercial e-mail message may be sent.

What is claimed is:

1. A method of controlling electronic mail (e-mail) message transmission over a network comprised of:
   receiving, by a third entity, a first set of hash encoded e-mail addresses from a first entity, wherein said first set of hash encoded e-mail addresses represents e-mail addresses to which an e-mail message could be sent;
   compiling, by said third entity, a second set of hash encoded e-mail addresses, wherein said second set of hash encoded e-mail addresses represents e-mail addresses to which said e-mail message should not be sent;
   sorting said first set of hash encoded e-mail addresses into a first ordered list;
   sorting said second set of hash encoded e-mail addresses into a second ordered;
   comparing the first entry in said first ordered list to the first entry in said second ordered list then successive entries in said second ordered list, until the value of an entry in said second ordered list equals or exceeds the value of the first entry in said first list; and
   removing, by said third entity, from said first set of hash encoded e-mail addresses, each hash encoded e-mail address that is in said second set of hash encoded e-mail addresses thereby yielding a third set of hash encoded e-mail addresses, wherein said third set of hash encoded e-mail addresses represents e-mail addresses to which said e-mail message will be sent,
   wherein a second entity is a source of said e-mail message and wherein the first, second, and third entities are different entities.

2. The method of claim 1 wherein receiving said first set of encoded e-mail addresses includes receiving a first set of hash coded e-mail addresses.

3. The method of claim 1 wherein said first entity is an e-mail mass mailer.

4. The method of claim 1 wherein removing, by said third entity, from said first set of encoded e-mail addresses, each encoded e-mail address that is in said second set of encoded e-mail addresses thereby yielding said third set of encoded e-mail addresses comprises:
   sorting said first set of encoded e-mail addresses into a first ordered list of encoded e-mail addresses wherein said encoded e-mail addresses are in ascending order;
   sorting said second set of encoded e-mail addresses into a second ordered list of encoded e-mail addresses wherein encoded e-mail addresses are in ascending order;
   beginning with a first entry in said first ordered list of encoded e-mail addresses, and beginning with a first entry in said second ordered list, comparing the first entry in said first ordered list to the first entry in said second ordered list then successive entries in said second ordered list, until the value of an entry in said second ordered list equals or exceeds the value of the first entry in said first list; and
   removing the first entry from said first list upon the detection in said second ordered list of the first entry in said first ordered list, thereby yielding said third set of encoded e-mail addresses.

5. The method of claim 1 further including sending said third set of encoded e-mail addresses to an e-mail mass mailer via a data network.

6. The method of claim 1 further including:
   identifying e-mail addresses that are encoded in said third set of encoded e-mail addresses; and
   e-mailing said e-mail message to said identified e-mail addresses.

7. A method of controlling electronic mail (e-mail) message transmission over a network comprised of:
   receiving, by a third entity, a first set of hash codes from a first entity, wherein said first set of hash codes represents e-mail addresses to which an e-mail message could be sent;
   receiving, by said third entity, a second set of hash codes from a second entity, wherein said second set of hash codes represents e-mail addresses to which said e-mail message should not be sent;
   sorting said first set of hash encoded e-mail addresses into a first ordered list;
   sorting said second set of hash encoded e-mail addresses into a second ordered;
   comparing the first entry in said first ordered list to the first entry in said second ordered list then successive entries in said second ordered list, until the value of an entry in said second ordered list equals or exceeds the value of the first entry in said first list; and
   removing, by said third entity, from said first set of hash codes, each hash code that is in said second set thereby yielding a third set of hash codes, wherein said third set of hash codes represents e-mail addresses to which said e-mail message will be sent,
   wherein said second entity is a source of said e-mail message and wherein the first, second, and third entities are different entities.

8. The method of claim 7 wherein said first entity is an e-mail mass mailer.

9. The method of claim 7 wherein removing, by said third entity, from said first set of hash codes, each hash code that is in said second set thereby yielding said third set of hash codes comprises:
   i) sorting said first set of hash codes into a first ordered list of hash codes;
   ii) sorting said second set of hash codes;
   iii) beginning with a first entry in said first ordered list of hash codes and beginning with a first entry in said second ordered list, comparing the first entry in said first ordered list of hash codes to said first entry in said second ordered list of hash codes and successive entries in said second ordered list of hash codes, until the value of an entry in said second ordered list equals or exceeds the value of the first entry in said first list, or until the last entry in the second ordered list of hash codes has been compared; and
   iv) upon the detection in said first ordered list of hash codes, of an entry in said second ordered list of hash codes that is identical to said first entry in said first ordered list, removing the first entry from said first ordered list.

10. The method of claim 7 further including sending said third set of encoded e-mail addresses to an e-mail mass mailer via a data network.

11. A method of controlling electronic mail (e-mail) message transmission over a network comprised of:
   receiving, by a third entity, a first set of hash codes from a first entity, wherein said first set of hash codes represents e-mail addresses to which an e-mail message could be sent;
   receiving, by said third entity, a second set of hash codes from a second entity, wherein said second set of hash codes represents e-mail addresses to which said e-mail message should not be sent;
   sorting said first set of hash encoded e-mail addresses into a first ordered list;
   sorting said second set of hash encoded e-mail addresses into a second ordered;
   comparing the first entry in said first ordered list to the first entry in said second ordered list then successive entries in said second ordered list, until the value of an entry in said second ordered list equals or exceeds the value of the first entry in said first list; and
   creating, by said third entity, a third set of hash codes that is comprised of the first set of hash codes minus hash codes that appear in the second set of hash codes, said third set of hash codes representing e-mail addresses to which said e-mail message will be sent,
   wherein said second entity is a source of said e-mail message and wherein the first, second, and third entities are different entities.

12. The method of claim 11 wherein said first entity is an e-mail mass mailer.

13. The method of claim 11, wherein creating said third set of hash codes comprises:
   sorting said first set of hash codes into a first ordered list of hash codes;
   sorting said second set of hash codes into a second ordered list of hash codes; and
   copying entries of said first ordered list of hash codes into said third set of hash codes that do not exist in said second ordered list of hash codes.

14. The method of claim 11 further including sending said third set of hash codes to an e-mail mass mailer via a data network.

15. A method of controlling electronic mail (e-mail) message transmission over a data network comprised of:
- receiving, by a third entity, a first set of hash codes from an e-mail mass mailer, said first set of hash codes being received via said data network, wherein said first set of hash codes represents e-mail addresses to which an e-mail message could be sent;
- sorting said first set of hash encoded e-mail addresses into a first ordered list;
- sorting a second set of hash encoded e-mail addresses into a second ordered, wherein said second set of hash codes represents e-mail addresses to which said e-mail message should not be sent;
- comparing, by a third entity, said first set of hash codes to said second set of hash codes; and
- removing, by said third entity, form said first set of hash codes, hash codes that are in said second set of hash codes to yield a third set of hash codes that represents e-mail addresses to which said e-mail message will be sent,
- wherein a second entity is a source of said e-mail message and wherein the first, second, and third entities are different entities.

16. The method of claim 15 further comprising sending said third set of hash codes back to said e-mail mass mailer.

17. The method of claim 15 wherein said first and second sets of hash codes are comprised of alpha-numeric characters and are of the same length.

18. A method of controlling electronic mail (e-mail) message transmission over a data network comprised of:
- receiving, by a third entity, a first set of hash codes from an e-mail mass mailer, said first set of hash codes being received via said data network and representing e-mail addresses to which an e-mail message could be sent;
- sorting said first set of hash encoded e-mail addresses into a first ordered list;
- sorting a second set of hash encoded e-mail addresses into a second ordered, wherein said second set of hash codes represents e-mail addresses to which said e-mail message should not be sent;
- comparing, by said third entity, said first set of hash codes to said second set of hash codes; and
- creating, by said third entity, a third set of hash codes that is comprised of hash codes in said first set of hash codes that are not in said second set of hash codes, wherein said third set of hash codes represents e-mail addresses to which said e-mail message will be sent,
- wherein a second entity is a source of said e-mail message and wherein the first, second, and third entities are different entities.

19. The method of claim 18 further comprising sending said third set of hash codes back to said e-mail mass mailer.

20. The method of claim 19 wherein said first and second sets of hash codes are comprised of alpha-numeric characters and are of the same length.

21. A method of controlling electronic mail (e-mail) message transmission over a network comprised of:
- receiving, by a third entity, a first set of hash coded e-mail addresses from a first entity, wherein said first set of hash coded e-mail addresses represents e-mail addresses to which an e-mail message could be sent;
- compiling, by said third entity, a second set of hash coded e-mail addresses, wherein said second set of hash coded e-mail addresses represents e-mail addresses to which said e-mail message should not be sent;
- sorting said first set of hash encoded e-mail addresses into a first ordered list;
- sorting said second set of hash encoded e-mail addresses into a second ordered;
- identifying, by said third entity, hash coded e-mail addresses in said first set of hash coded e-mail addresses that do not appear in said second set of hash coded e-mail addresses; and
- removing, by said third entity, from said first set of hash coded e-mail addresses, each hash coded e-mail address that is not in said second set of hash coded e-mail addresses thereby yielding a third set of hash coded e-mail addresses that represent e-mail addresses to which said e-mail message will be sent,
- wherein a second entity is a source of said e-mail message and wherein the first, second, and third entities are different entities.

22. The method of claim 21 further including sending said third set of hash coded e-mail addresses to an e-mail sender via a data network.

23. A method of sending an electronic mail (e-mail) message to a plurality of e-mail addresses comprised of:
- hash coding, by a first entity, a first list of e-mail addresses to yield a first list of hash coded e-mail addresses, wherein said first list of hash coded e-mail addresses represents e-mail addresses to which an e-mail message could be sent;
- hash coding, by a second entity, a second list of e-mail addresses to yield a second list of hash coded-email addresses, wherein said second list of hash coded e-mail addresses represents e-mail addresses to which said e-mail message should not be sent;
- transmitting, by said first entity, said first list of hash coded e-mail addresses to an e-mail address filtration service provider;
- transmitting, by said second entity, said second set of hash coded e-mail addresses to said e-mail address filtration service provider;
- comparing the first entry in a first ordered list to the first entry in a second ordered list then successive entries in said second ordered list, until the value of an entry in said second ordered list equals or exceeds the value of the first entry in said first list; and
- creating, by said e-mail address filtration service provider a third list of hash coded e-mail addresses, said third set of hash codes that is comprised of the first set of hash codes minus hash codes that appear in the second set of hash codes, wherein said third list of hash coded e-mail addresses represents e-mail addresses to which said e-mail message will be sent,
- wherein said second entity is a source of said e-mail message and wherein the first, second, and third entities are different entities.

24. An apparatus for controlling electronic mail (e-mail) message transmission over a network comprised of:
- a computer, operatively coupled to a data network, wherein said data network includes or is operatively coupled to a first entity and a second entity, wherein said computer is capable of receiving from said first entity a first set of hash encoded e-mail addresses, wherein said first set of hash encoded e-mail addresses represents e-mail addresses to which an e-mail message could be sent, and wherein said second entity is the source of said e-mail message;
- a first memory device, operatively coupled to said computer, said first memory device storing a second set of hash encoded e-mail addresses representing e-mail addresses to which an e-mail message should not be sent; and said first memory device also storing program instructions which when executed, by said computer, cause said computer to:

store in said first memory device, at least part of said first set of hash encoded e-mail addresses;

sort said first set of hash encoded e-mail addresses into a first ordered list;

sort said second set of hash encoded e-mail addresses into a second ordered;

compare the first entry in said first ordered list to the first entry in said second ordered list then successive entries in said second ordered list, until the value of an entry in said second ordered list equals or exceeds the value of the first entry in said first list;

remove from said first set of encoded e-mail addresses stored in said memory, each encoded e-mail address in said second set of encoded e-mail addresses that is also in said first set of encoded e-mail addresses thereby yielding a third set of encoded e-mail addresses, said third set of encoded e-mail addresses being encoded e-mail addresses to which said e-mail message will be sent; and store at least part of said third set of encoded e-mail addresses in said memory, wherein the first and second entities are different entities.

25. The apparatus of claim 24 wherein said program instructions, when executed by said computer, further cause said computer to sort said first set of encoded e-mail addresses.

26. An apparatus for controlling electronic mail (e-mail) message transmission over a network comprised of:

a computer, operatively coupled to a data network, wherein said data network includes or is operatively coupled to a first entity and a second entity, wherein said computer is capable of receiving from said first entity a first set of hash codes, wherein said first set of hash codes represents e-mail addresses to which an e-mail message could be sent, wherein said second entity is the source of said e-mail message, and wherein said computer is also capable of executing program instructions;

a first memory device, operatively coupled to said computer, said first memory device storing a second set of hash codes, wherein said second set of hash codes represents e-mail addresses to which an e-mail message could not be sent;

said first memory device also storing program instructions which when executed by said computer cause said computer to:

store in said first memory device, at least part of said first set of hash codes;

sort said first set of hash encoded e-mail addresses into a first ordered list;

sort said second set of hash encoded e-mail addresses into a second ordered;

compare the first entry in said first ordered list to the first entry in said second ordered list then successive entries in said second ordered list, until the value of an entry in said second ordered list equals or exceeds the value of the first entry in said first list;

remove from said first set of hash codes, each hash code in said second set of hash codes, yielding a third set of hash codes, said third set of hash codes representing e-mail addresses to which an e-mail message will be sent; and store at least part of said third set of hash codes in said memory, wherein the first and second entities are different entities.

27. The apparatus of claim 26, wherein said program instructions, when executed by said computer, further cause said computer to compare e-mail addresses that have been encoded using a hash code algorithm.

28. The apparatus of claim 26, wherein said program instructions, when executed by said computer, further cause said computer to sort hash codes that represent e-mail addresses.

29. The apparatus of claim 26, wherein said program instructions, when executed by said computer, further cause said computer to hash code a variable-length string of an e-mail addresses into a fixed-length string of alpha-numeric characters.

30. The method of claim 1 further including, prior to receiving said first set of encoded e-mail addresses, specifying an e-mail address domain name and purging from said first set of encoded e-mail addresses, all encoded e-mail addresses associated with said domain name.

31. The method of claim 7 further including, prior to receiving said first set of hash codes, specifying an e-mail address domain name and purging from said first set of hash codes all hash codes associated with said domain name.

32. The method of claim 1, further comprising sending, by said third entity, to each of the first entity and the second entity an encoding algorithm for encoding e-mail addresses.

33. The method of claim 7, further comprising ending, by said third entity, to each of the first entity and the second entity a hashing algorithm for hashing e-mail addresses.

34. The method of claim 1, wherein said third entity is an e-mail list manager.

35. The method of claim 7, wherein said third entity is an e-mail list manager.

36. The method of claim 7, further comprising:
identifying, by said first entity, e-mail addresses that are hashed in said third set of hash codes; and
e-mail said e-mail message to said identified e-mail addresses.

37. The apparatus of claim 24, wherein said program instructions, when executed by said computer, further cause said computer to send, to each of a first entity and a second entity an encoding algorithm for encoding e-mail addresses.

38. The apparatus of claim 26, wherein said programming instructions, when executed by said computer, further cause said computer to send, to each of a first entity and a second entity a hashing algorithm for hashing e-mail addresses.

39. The apparatus of claim 24, wherein:
said computer is associated with an e-mail list manager; and
said first entity is associated with an e-mail mass mailer.

40. The apparatus of claim 26, wherein:
said computer is associated with an e-mail list manager; and
said first entity is associated with an e-mail mass mailer.

41. The apparatus of claim 24, wherein said programming instructions, when executed by said computer, further causes said computer to send the at least part of said third set of encoded e-mail addresses to said first entity.

42. The apparatus of claim 26, wherein said programming instructions, when executed by said computer, further causes said computer to send the at least part of said third set of hash codes to said first entity.

* * * * *